(12) United States Patent
Korzen et al.

(10) Patent No.: US 7,887,901 B2
(45) Date of Patent: Feb. 15, 2011

(54) ARTICLE MADE FROM A POLY(ARYLENE ETHER)/POLYAMIDE COMPOSITION

(75) Inventors: Andrew Paul Korzen, Selkirk, NY (US); Sai-Pei Ting, Slingerlands, NY (US)

(73) Assignee: Sabic Innovative Plastics IP B.V. (NL)

( * ) Notice: Subject to any disclaimer, the term of this patent is extended or adjusted under 35 U.S.C. 154(b) by 842 days.

(21) Appl. No.: 11/462,821

(22) Filed: Aug. 7, 2006

(65) Prior Publication Data

US 2007/0003738 A1    Jan. 4, 2007

Related U.S. Application Data

(63) Continuation-in-part of application No. 11/169,606, filed on Jun. 29, 2005, now abandoned.

(51) Int. Cl.
| | |
|---|---|
| *B60C 1/00* | (2006.01) |
| *C08K 3/04* | (2006.01) |
| *C08G 65/48* | (2006.01) |
| *C08L 71/12* | (2006.01) |
| *C08L 67/00* | (2006.01) |
| *C08L 77/00* | (2006.01) |
| *B05D 1/04* | (2006.01) |
| *B05D 1/32* | (2006.01) |
| *H05C 1/00* | (2006.01) |

(52) U.S. Cl. ............... 428/156; 428/192; 428/213; 525/390; 525/391; 525/397; 524/495; 524/496; 427/458; 427/467; 427/475

(58) Field of Classification Search ............... 428/156, 428/192, 213; 524/495, 496; 525/390, 391, 525/397; 427/457, 458, 467, 469, 475
See application file for complete search history.

(56) References Cited

U.S. PATENT DOCUMENTS

| 2,071,250 A | 2/1937 | Carothers |
| 2,071,251 A | 2/1937 | Carothers |

(Continued)

FOREIGN PATENT DOCUMENTS

EP    0685527    12/1995

(Continued)

OTHER PUBLICATIONS

Akzo Chemie, Rubber & Plastics Processing Chemicals Electroconductive Carbon Black Ketjenblack brochure, Dec 1987, 9 pages.

(Continued)

*Primary Examiner*—David R Sample
*Assistant Examiner*—Catherine Simone
(74) *Attorney, Agent, or Firm*—Cantor Colburn LLP

(57) ABSTRACT

An article comprising a paint film disposed on at least a portion of a thermoplastic section. The thermoplastic section is made of a thermoplastic composition. The thermoplastic composition has a compatibilized blend of a poly(arylene ether) and a polyamide, an electrically conductive carbon black, and an impact modifier. The electrically conductive carbon black has agglomerates and the agglomerates have an average agglomerate size greater than or equal to 30 square micrometers. The weight ratio of electrically conductive carbon black to polyamide is greater than or equal to 0.043.

38 Claims, 6 Drawing Sheets

U.S. PATENT DOCUMENTS

| | | |
|---|---|---|
| 2,130,523 A | 9/1938 | Carothers |
| 2,130,948 A | 9/1938 | Carothers |
| 2,241,322 A | 5/1941 | Hanford |
| 2,312,966 A | 4/1943 | McNamara |
| 2,512,606 A | 6/1950 | Bolton |
| 3,379,792 A | 4/1968 | Finholt |
| 4,772,664 A | 9/1988 | Ueda et al. |
| 4,863,996 A | 9/1989 | Nakazima et al. |
| 4,970,272 A | 11/1990 | Gallucci |
| 5,132,365 A | 7/1992 | Gallucci |
| 6,593,411 B2 * | 7/2003 | Koevoets et al. ............ 524/451 |
| 6,887,930 B2 | 5/2005 | Uchida et al. |
| 6,942,823 B2 * | 9/2005 | Terada et al. ................ 252/511 |
| 2003/0116757 A1 | 6/2003 | Miyoshi et al. |
| 2003/0166762 A1 | 9/2003 | Koevoets et al. |
| 2005/0199859 A1 | 9/2005 | Terada et al. |

FOREIGN PATENT DOCUMENTS

| | | |
|---|---|---|
| EP | 0866098 | 9/1998 |
| EP | 1666532 | 9/1998 |
| EP | 1125985 | 8/2001 |
| EP | 1473317 | 11/2004 |
| WO | WO 2004052557 A1 * | 6/2004 |
| WO | 2005003236 | 1/2005 |

OTHER PUBLICATIONS

GE Plastics, Noryl GTX profile, 2001, pp. 1-30.

Van Drumpt, J.D., Developments in Conductive Carbon Blacks, Plastics Compounding, Mar./Apr. 1988, vol. 11, Issue 2, pp. 37, 40, 42, and 44.

International Search Report for International Application No. PC/US2007/069514, mailed Oct. 30, 2007, 6 pages.

Written opinion for International Search Report for International Application No. PC/US2007/069514, mailed Oct. 30, 2007, 5 pages.

* cited by examiner

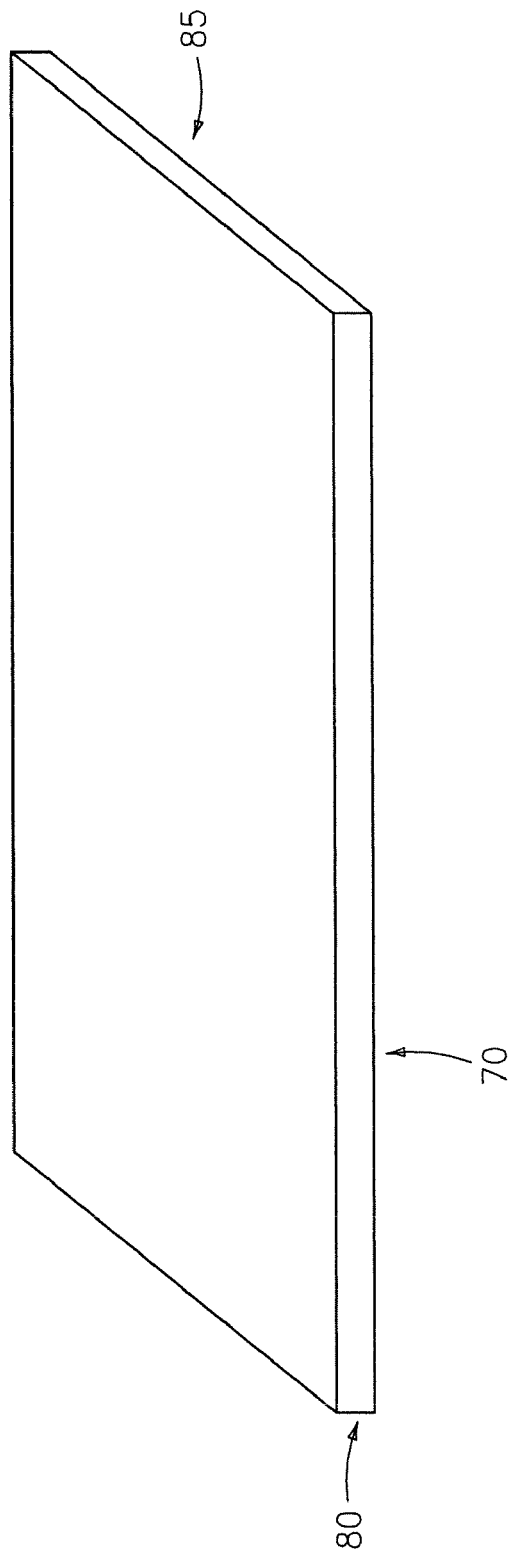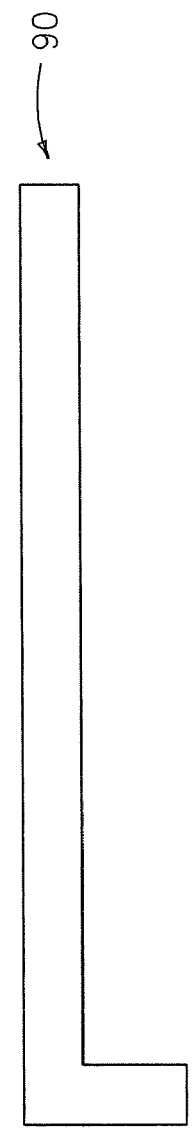
FIG. 8
FIG. 9

ARTICLE MADE FROM A POLY(ARYLENE ETHER)/POLYAMIDE COMPOSITION

CROSS REFERENCE TO RELATED APPLICATIONS

This application is a continuation in part of U.S. patent application Ser. No. 11/169,606 filed on Jun. 29, 2005, now abandoned, which is incorporated by reference herein in its entirety.

BACKGROUND OF INVENTION

This disclosure is directed to blends of poly(arylene ether) and polyamide. In particular, the disclosure is directed to blends of poly(arylene ether) and polyamide having low specific volume resistivity.

Poly(arylene ether) resins have been blended with polyamide resins to provide compositions having a wide variety of beneficial properties such as heat resistance, chemical resistance, impact strength, hydrolytic stability, and dimensional stability. Blends of poly(arylene ether) and polyamide which contain conductive carbon black been successfully painted by electrostatic painting and blends useful for electrostatic painting are commercially available.

Increasingly there is a trend in the painting industry to employ powder coating. However, commercially available compatibilized blends of poly(arylene ether) and polyamide, when powder coated, may not result in aesthetically acceptable coated articles. For example, the films produced by powder coating commercially available blends can suffer from uneven thickness that is visible to the naked eye and is aesthetically unpleasing.

BRIEF DESCRIPTION OF THE INVENTION

The afore-mentioned difficulty is addressed by an article comprising a paint film disposed on at least a portion of a thermoplastic section. The thermoplastic section is made from a composition comprising:

a compatibilized blend of a poly(arylene ether) and a polyamide;

an electrically conductive carbon black; and an impact modifier, wherein the electrically conductive carbon black comprises agglomerates and the agglomerates have an average agglomerate size greater than or equal to 30 square micrometers, and wherein the weight ratio of electrically conductive carbon black to polyamide is greater than or equal to 0.043.

Also disclosed are methods of making the article.

BRIEF DESCRIPTION OF THE DRAWINGS

FIGS. 8 and 9 are illustrative of the injection molded parts employed in the examples.

DETAILED DESCRIPTION

The terms "a" and "an" herein do not denote a limitation of quantity, but rather denote the presence of at least one of the referenced item. All ranges disclosed herein are inclusive and combinable (e.g., ranges of "up to 25 wt %, or, more specifically, 5 wt % to 20 wt %," is inclusive of the endpoints and all intermediate values of the ranges of "5 wt % to 25 wt %," etc.). The terms surface A, edge B, line E and the like are used herein merely for descriptive convenience and are not limited to any one position or spatial orientation. The terms "edge thickness" and "interior thickness" as used herein are determined along a line perpendicular to the referenced edge. The edge thickness and the interior thickness are determined after the paint film is disposed on the article but before further processing such as sanding and the like. The suffix "(s)" as used herein is intended to include both the singular and the plural of the term that it modifies, thereby including one or more of that term (e.g., the sample(s) includes one or more samples). Furthermore, as used herein, "combination" is inclusive of blends, mixtures, alloys, reaction products, and the like.

As mentioned above it is unexpectedly difficult to consistently and evenly powder coat an article comprising an electrically conductive carbon black and a compatibilized blend of poly(arylene ether) and polyamide. Electrostatic painting of conductive thermoplastics has been performed successfully for several years. In electrostatic painting, charged atomized particles of liquid paint are attracted to a grounded thermoplastic section. The liquid paint comprises a solvent or carrier which is evaporated after the application to the thermoplastic section thus forming a paint film. In powder coating charged solid particles are attracted to a grounded thermoplastic section. The thermoplastic section and powder are then heated to a temperature sufficient for the powder to melt and form a paint film. Powder coating of articles made of commercially available compositions comprising an electrically conductive carbon black and a compatibilized blend of poly(arylene ether) and polyamide can result in coated articles having a non-continuous paint film, picture framing, or a non-continuous paint film with picture framing.

Non-continuous paint film is defined as a paint film comprising defects such as gaps and pin holes in which the thermoplastic section can be seen by the unaided eye.

Figure 6:
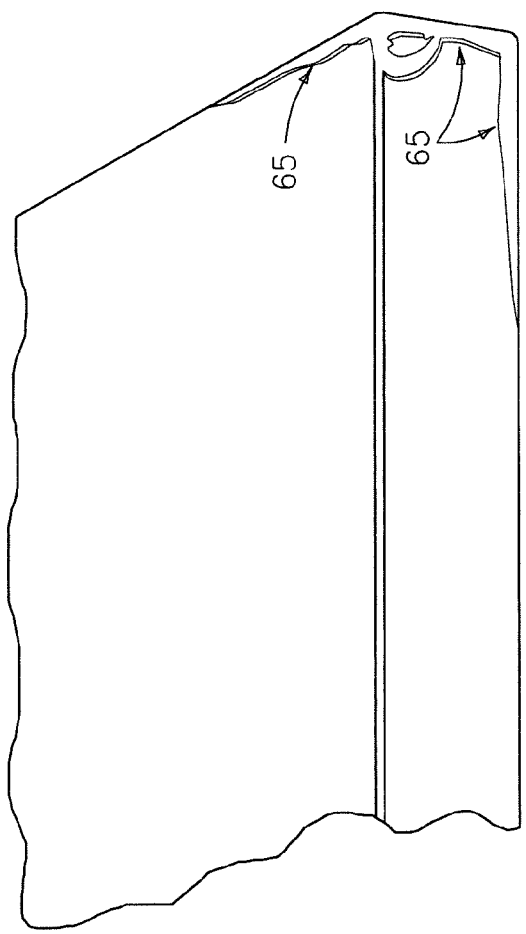
FIGS. 6 and 7 show the picture framing phenomenon.
Figure 7:
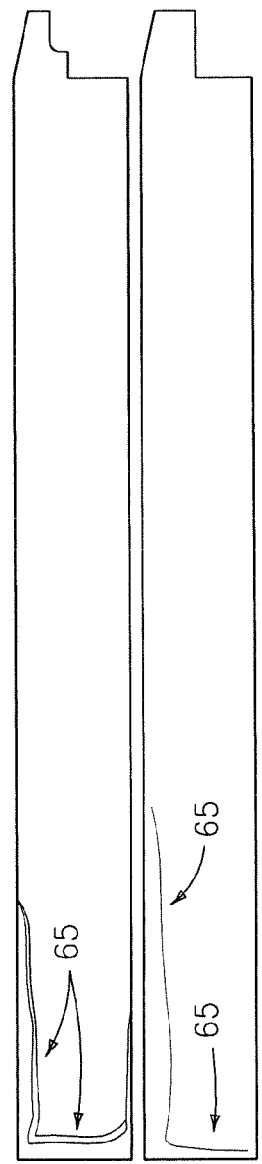

Picture framing is a known phenomenon wherein the thickness of the paint film at an edge of the article is significantly different than the thickness of the paint film over an interior area. The change in thickness is typically relatively abrupt and can be detected by the unaided eye. An unaided eye excludes the use of optical devices for magnification with the exception of corrective lenses needed for normal eyesight. The picture framing may appear at parts of an edge of an article, over an entire edge of the article, at an edge formed by a surface feature, or near to the corners of the article. Exemplary picture framing, 65, is shown in FIGS. 6 and 7.

Not to be limited by theory, the quality of the paint film is dependent upon the specific volume resistivity, the quantity of electrically conductive carbon black, distribution of the electrically conductive carbon black, the relative amounts of electrically conductive carbon black and polyamide, or a combination of two or more of the foregoing. The distribution of the electrically conductive carbon black is reflected in the average agglomerate size of the electrically conductive carbon black and the average agglomerate size of the electrically conductive carbon black can have a significant impact of the quality of the powder coating and, more specifically, on the ability to routinely and consistently obtain a paint film free of picture framing.

In some embodiments, an article comprises a thermoplastic section and a paint film disposed on at least a portion of the thermoplastic section. The thermoplastic section has a surface that may have any shape. The thermoplastic section is formed from the thermoplastic composition described herein. The paint film on the article has less than or equal to 5 variations, or, more specifically, less than or equal to 3 variations, or, even more specifically, less than or equal to 1 variation in thickness that is visible to the unaided eye at a distance of 25 centimeters (cm). In some embodiments the paint film on the article is free of variations visible to the unaided eye at a distance of 25 centimeters. The paint film may be produced by electrostatic painting or powder coating.

Figure 1:
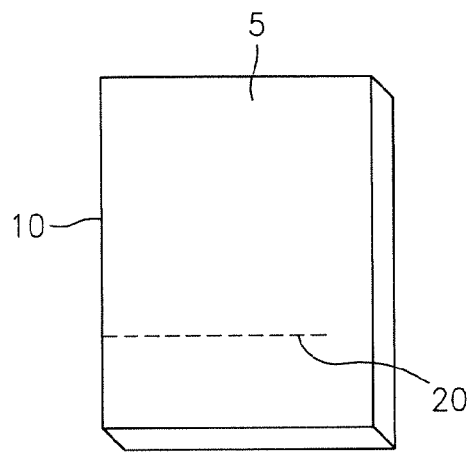
FIGS. 1-5 show exemplary articles for the measurement of edge and interior paint film thickness.

In some embodiments, an article comprises a thermoplastic section and a paint film disposed on at least a portion of the thermoplastic section. The thermoplastic section is formed from the thermoplastic composition described herein. The thermoplastic section has a surface which may have any shape. For convenience the surface is depicted as a rectangle in FIG. 1. FIG. 1 shows a surface A, 5, which has an edge B, 10. The paint film is disposed on at least a portion of surface A and specifically on edge B. The thickness of the paint film at edge B (the edge thickness) is determined at 3.175 millimeters (mm) from edge B along a line that is perpendicular to edge B (line E, 20). The paint film has an interior thickness that is measured on line E at a distance that is 14 mm from edge B. The edge thickness is 60% to 150% of the interior thickness. In some embodiments line E is at least 14 mm from any edge adjoining edge B. The paint film may be produced by electrostatic painting or powder coating.

Figure 2:
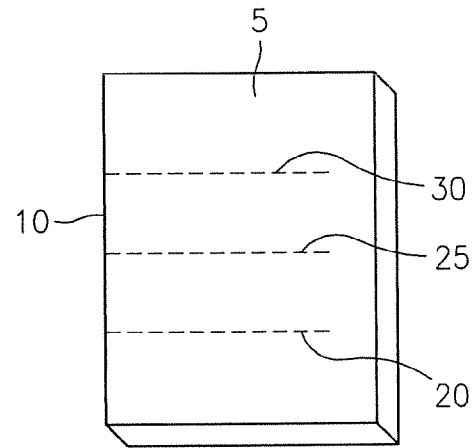

In some embodiments, the average edge thickness is 60% to 150% of the average interior thickness. The average edge thickness is the average of three edge thicknesses measured as described above on three separate lines perpendicular to edge B. The average interior thickness is the average of three interior thicknesses measured as described above and corresponding to the three edge thicknesses used to determine the average edge thickness. For example, FIG. 2 shows a surface A, 5, and an edge B, 10. Three lines perpendicular to edge B: line E, 20, line F, 25, and line G, 30, are shown. The average edge thickness is the average of the thicknesses of the paint film at a distance of 3.175 mm from edge B along lines E, F, and G. The average interior thickness is the average of the thicknesses of the paint film along lines E, F, and G at a distance of 14 mm from edge B. In some embodiments the distance between lines E, F, and G is 10 to 20 mm. In some embodiments lines E, F, and G are at least 14 mm from any edge adjoining edge B.

In some embodiments, there is no point along edge B where the edge thickness is greater than 150% of the corresponding interior thickness.

Figure 3:
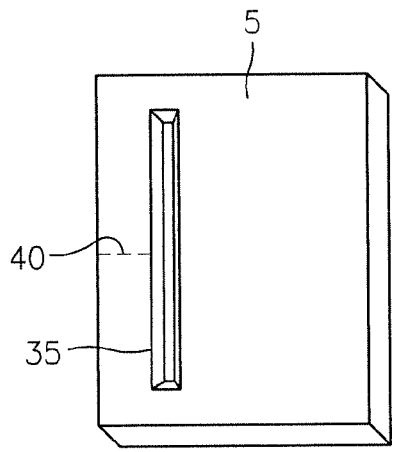
Figure 12:
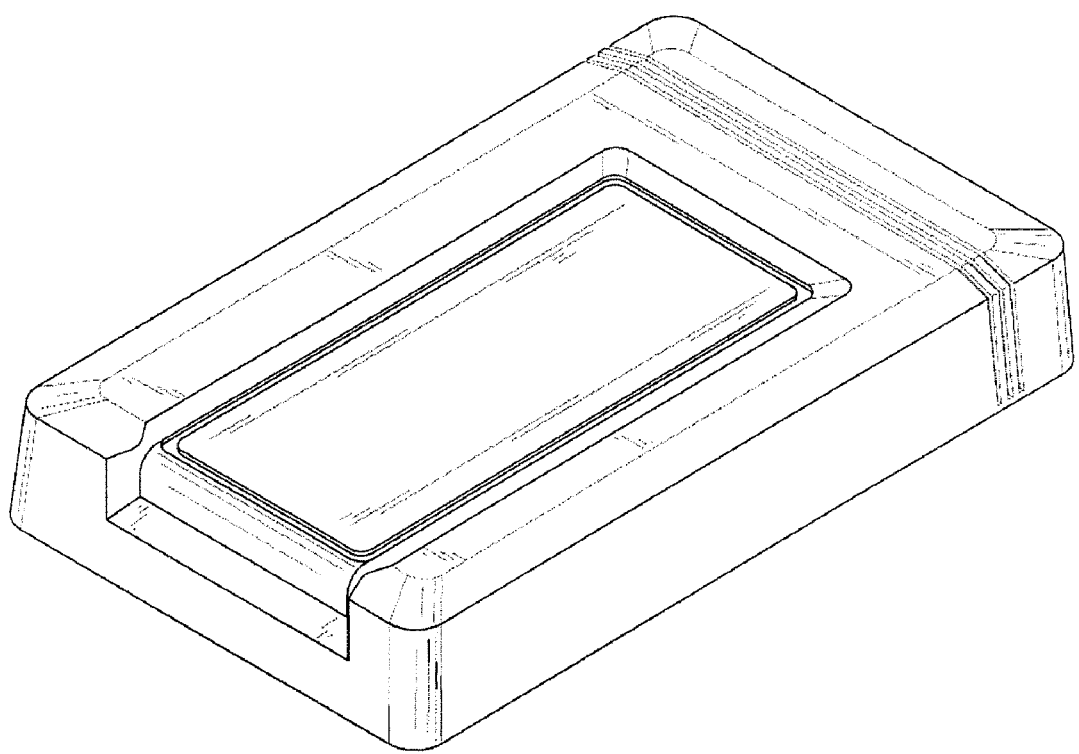
FIG. 12 shows an exemplary article having a variety of surface features.

In some embodiments, an article comprises a thermoplastic section and paint film disposed on at least a portion of the thermoplastic section. The thermoplastic section is formed from the thermoplastic composition described herein. The thermoplastic section has a surface that may have any shape. For convenience the surface is depicted as a rectangle in FIG. 3. FIG. 3 shows a surface A, 5, which has a surface feature edge D, 35. While the surface feature is shown as a single groove for simplicity, surface features may comprise one or more grooves, one or more protrusions, a hole through the thermoplastic section, or any combination thereof. FIG. 12 shows an exemplary article with a variety of surface features. The paint film is disposed on at least a portion of surface A and specifically on surface feature edge D. The thickness of the paint film at surface feature edge D (surface feature edge thickness) is determined at a distance of 2 mm from surface feature edge D along a line that is perpendicular to surface feature edge D (line C, 40). The paint film has an interior thickness that is measured on line C at a distance that is 10 mm from surface feature edge D. The surface feature edge thickness is 60% to 150% of the interior thickness. In some embodiments the interior thickness is measured at a distance of at least 14 mm from any edge of surface A. The paint film may be produced by electrostatic painting or powder coating.

Figure 4:
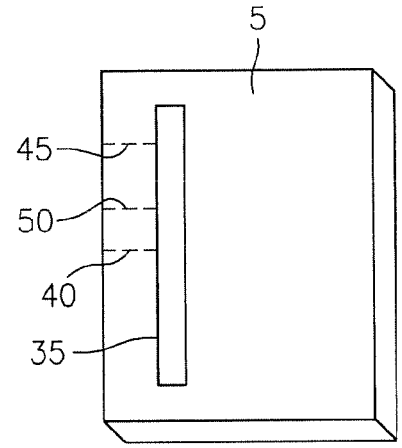

In some embodiments, the average surface feature edge thickness is 60% to 150% of the average interior thickness. The average surface feature edge thickness is the average of three surface feature edge thicknesses measured as described above along three separate lines perpendicular to surface feature edge D. The average interior thickness is the average of three interior thicknesses measured as described above and corresponding to the three surface feature edge thicknesses used to determine the average surface feature edge thickness. For example, FIG. 4 shows a surface A, 5, and a surface feature edge D, 35. Three lines perpendicular to surface feature edge D: line C, 40, line H, 45, and line I, 50, are shown. The average surface feature edge thickness is the average of the pain film thickness along lines C, H, and I at a distance of 2 mm from surface feature edge D. The average interior thickness is the average of the paint film thicknesses along lines C, H, and I at a distance of 10 mm from surface feature edge D. In some embodiments the distance between lines C, H, and I is 2 to 10 mm. In some embodiments lines C, H, and I are at least 14 mm from any edge other than surface feature edge D.

In some embodiments, there is no point along surface feature edge D where the surface feature edge thickness is greater than 150% of the corresponding interior thickness.

Figure 5:
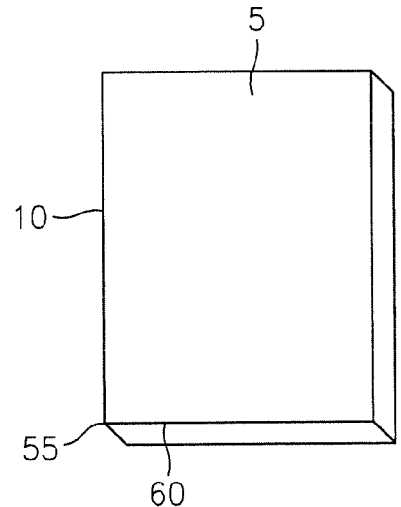

In some embodiments, an article comprises a thermoplastic section and a paint film disposed on at least a portion of the thermoplastic section. The thermoplastic section is formed from the thermoplastic composition described herein. The thermoplastic section has a surface which may have any shape comprising a corner. A corner is defined as the intersection of two edges of surface A. FIG. 5 shows a surface A, 5, which has a corner J, 55, formed by the intersection of edge B, 10, and edge K, 60. The paint film is disposed on corner J and extends from corner J along edge B and edge K for at least a portion of edge B and edge K. The paint film has an average edge thickness that is 60% to 150% of the interior thickness. The average edge thickness is the average of the paint film thickness measured at three points: a first corner point located at a distance of 14-20 mm from corner J and 3.175 mm from edge B, a second corner point located at a distance of 14-20 mm from corner J and 3.175 mm from edge K and a third corner point located at a distance of 3.175 mm from edges B and K. The interior thickness is located at a distance of 14-20 mm from edge B and edge K. The distances from edge B and edge K are measured along lines perpendicular to the respective edge. The paint film may be produced by electrostatic painting or powder coating.

In some embodiments, the average edge thickness is 60% to 150% of the corresponding interior thickness for greater than or equal to two corners, or, more specifically, greater than or equal to three corners, or, even more specifically, greater than or equal to four corners of the article. In some embodiment the average edge thickness is 60% to 150% of the corresponding interior thickness for all corners of the article.

Typical paint film thicknesses produced by powder coating are 0.038 to 0.178 millimeter. Within this range, the paint film thickness may be greater than or equal to 0.051 millimeter, or, more specifically, greater than or equal to 0.076 millimeter. Also within this range the paint film thickness may be less than or equal to 0.152 millimeter, or, more specifically, less than or equal to 0.127 millimeter.

Paint film thickness can be determined by optical microscopy of a section taken perpendicular to the plane of the coated surface at a specified location of the article as described in the examples. Alternatively scanning electron microscopy (SEM) can be used as described in the examples.

Continuous powder coating coverage is defined as having substantially no defects that are gaps or holes in the paint film that are detectable to the unaided eye at a distance of 25 centimeters, or, more specifically no defects that are gaps or holes in the coating that are greater than 1 mm across at any point. In one embodiment, the continuous coating is free of defects that are gaps or holes that are greater than 0.5 mm across at any point. In another embodiment, the continuous coating is free of defects that are gaps or holes that are greater than 0.2 mm across at any point. In yet another embodiment, the continuous coating is free of defects that are gaps or holes that are greater than 0.1 mm across at any point.

Specific volume resistivity (SVR) is a measure of the leakage current directly through a material. It is defined as the electrical resistance through a one-centimeter cube of material and is expressed in ohm-cm. The lower the specific volume resistivity of a material, the more conductive the material is. In some embodiments the composition has a specific volume resistivity less than or equal to $1 \times 10^3$ ohm-cm, or, more specifically, less than or equal to $0.9 \times 10^3$ ohm-cm, or, even more specifically, less than or equal to $0.8 \times 10^3$ ohm-cm. Specific volume resistivity may be determined as described in the Examples.

The thermoplastic section comprises a thermoplastic composition. The thermoplastic composition comprises a compatibilized blend of a poly(arylene ether) and a polyamide, an electrically conductive carbon black, and an impact modifier.

Poly(arylene ether) comprises repeating structural units of formula (I)

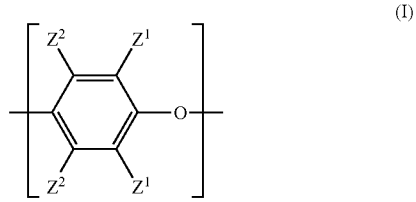

wherein for each structural unit, each $Z^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms.

As used herein, the term "hydrocarbyl", whether used by itself, or as a prefix, suffix, or fragment of another term, refers to a residue that contains only carbon and hydrogen. The residue may be aliphatic or aromatic, straight-chain, cyclic, bicyclic, branched, saturated, or unsaturated. It may also contain combinations of aliphatic, aromatic, straight chain, cyclic, bicyclic, branched, saturated, and unsaturated hydrocarbon moieties. However, when the hydrocarbyl residue is described as "substituted", it may contain heteroatoms over and above the carbon and hydrogen members of the substituent residue. Thus, when specifically described as substituted, the hydrocarbyl residue may also contain halogen atoms, nitro groups, cyano groups, carbonyl groups, carboxylic acid groups, ester groups, amino groups, amide groups, sulfonyl groups, sulfoxyl groups, sulfonamide groups, sulfamoyl groups, hydroxyl groups, alkoxyl groups, or the like, and it may contain heteroatoms within the backbone of the hydrocarbyl residue.

The poly(arylene ether) may comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) may be in the form of a homopolymer; a copolymer; a graft copolymer; an ionomer; or a block copolymer; as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units.

The poly(arylene ether) may be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

The poly(arylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) or combination of poly(arylene ether)s can have an initial intrinsic viscosity of 0.25 to 0.6 deciliters per gram (dl/g), as measured in chloroform at 25° C. Initial intrinsic viscosity is defined as the intrinsic viscosity of the poly(arylene ether) prior to melt mixing with the other components of the composition and final intrinsic viscosity is defined as the intrinsic viscosity of the poly(arylene ether) after melt mixing with the other components of the composition. As understood by one of ordinary skill in the art, the viscosity of the poly(arylene ether) may be up to 30% higher after melt mixing. The percentage of increase can be calculated by (final intrinsic viscosity—initial intrinsic viscosity)/initial intrinsic viscosity. Determining an exact ratio, when two intrinsic viscosities are used, will depend somewhat on the exact intrinsic viscosities of the poly(arylene ether) used and the ultimate physical properties that are desired.

In one embodiment the poly(arylene ether) has a glass transition temperature (Tg) as determined by differential scanning calorimetry (DSC at 20° C./minute ramp), of 160° C. to 250° C. Within this range the Tg may be greater than or equal to 180° C., or, more specifically, greater than or equal to 200° C. Also within this range the Tg may be less than or equal to 240° C., or, more specifically, less than or equal to 230° C.

The composition comprises poly(arylene ether) in an amount of 15 to 65 weight percent (wt %). Within this range, the poly(arylene ether) can be present in an amount greater than or equal to 25 weight percent, or, more specifically, in an amount greater than or equal to 30 weight percent. Also within this range the poly(arylene ether) may be present in an amount less than or equal to 60 weight percent, or, more specifically, less than or equal to 55 weight percent, or, even more specifically, less than or equal to 50 weight percent. Weight percent is based on the total weight of the thermoplastic composition.

Polyamide resins, also known as nylons, are characterized by the presence of an amide group (—C(O)NH—), and are described in U.S. Pat. No. 4,970,272. Exemplary polyamide resins include, but are not limited to, nylon-6; nylon-6,6; nylon-4; nylon-4,6; nylon-12; nylon-6,10; nylon-6,9; nylon-6,12; amorphous polyamides; polyphthalamides; nylon-6/6T and nylon-6,6/6T with triamine contents less than 0.5 weight percent; nylon-9T and combinations comprising one or more of the foregoing polyamides. The composition may comprise two or more polyamides, for example the polyamide may comprises nylon-6 and nylon-6,6. In one embodiment the polyamide resin or combination of polyamide resins has a melting point (Tm) greater than or equal to 171° C. When the polyamide comprises a super tough polyamide, i.e. a rubber-toughed polyamide, the composition may or may not contain a separate impact modifier.

Polyamide resins may be obtained by a number of well known processes such as those described in U.S. Pat. Nos. 2,071,250; 2,071,251; 2,130,523; 2,130,948; 2,241,322; 2,312,966; 2,512,606; and 6,887,930. Polyamide resins are commercially available from a wide variety of sources.

Polyamide resins having an intrinsic viscosity of up to 400 milliliters per gram (ml/g) can be used, or, more specifically, having a viscosity of 90 to 350 ml/g, or, even more specifically, having a viscosity of 110 to 240 ml/g, as measured in a 0.5 wt % solution in 96 wt % sulfuric acid in accordance with ISO 307.

The polyamide may have a relative viscosity of up to 6, or, more specifically, a relative viscosity of 1.89 to 5.43, or, even more specifically, a relative viscosity of 2.16 to 3.93. Relative viscosity is determined according to DIN 53727 in a 1 wt % solution in 96 wt % sulfuric acid.

In one embodiment, the polyamide resin comprises a polyamide having an amine end group concentration greater than or equal to 35 microequivalents amine end group per gram of polyamide (µeq/g) as determined by titration with HCl. Within this range, the amine end group concentration may be greater than or equal to 40 µeq/g, or, more specifically, greater than or equal to 45 µeq/g. The maximum amount of amine end groups is typically determined by the polymerization conditions and molecular weight of the polyamide. Amine end group content may be determined by dissolving the polyamide in a suitable solvent, optionally with heat. The polyamide solution is titrated with 0.01 Normal hydrochloric acid (HCl) solution using a suitable indication method. The amount of amine end groups is calculated based on the volume of HCl solution added to the sample, the volume of HCl used for the blank, the molarity of the HCl solution and the weight of the polyamide sample.

The composition comprises polyamide in an amount of 30 to 85 weight percent. Within this range, the polyamide can be present in an amount greater than or equal to 33 weight percent, or, more specifically, in an amount greater than or equal to 38 weight percent, or, even more specifically, in an amount greater than or equal to 40 weight percent. Also within this range, the polyamide can be present in an amount less than or equal to 80 weight percent, or, more specifically, less than or equal to 75 weight percent, or, even more specifically, less than or equal to 70 weight percent. Weight percent is based on the total weight of the thermoplastic composition.

When used herein, the expression "compatibilizing agent" refers to polyfunctional compounds which interact with the poly(arylene ether), the polyamide resin, or both. This interaction may be chemical (e.g., grafting) and/or physical (e.g., affecting the surface characteristics of the dispersed phases). In either instance the resulting compatibilized poly(arylene ether)/polyamide composition appears to exhibit improved compatibility, particularly as evidenced by enhanced impact strength, mold knit line strength and/or elongation. As used herein, the expression "compatibilized poly(arylene ether)/polyamide blend" refers to those compositions which have been physically and/or chemically compatibilized with an agent as discussed above, as well as those compositions which are physically compatible without such agents, as taught in U.S. Pat. No. 3,379,792.

As understood by one of ordinary skill in the art, poly (arylene ether) and polyamide, when combined, form an immiscible blend. Immiscible blends have either, a continuous phase and a dispersed phase or two co-continuous phases. When a continuous phase and a dispersed phase are present, the size of the particles of the dispersed phase can be determined using electron microscopy. In a compatibilized poly (arylene ether)/polyamide blend the average diameter of the dispersed phase particles (poly(arylene ether)) is decreased compared to non-compatibilized poly(arylene ether)/polyamide blends. For example, compatibilized poly(arylene ether)/polyamide blends have an average poly(arylene ether) particle diameter less than or equal to 10 micrometers. In some embodiments the average particle diameter is greater than or equal to 0.05 micrometers. The average particle diameter in a pelletized blend may be smaller than in a molded article but in either case the average particle diameter is less than or equal to 10 micrometers. Determination of average particle diameter is known in the art and is taught, for example, in U.S. Pat. Nos. 4,772,664 and 4,863,996.

Examples of the various compatibilizing agents that may be employed include: liquid diene polymers, epoxy compounds, oxidized polyolefin wax, quinones, organosilane compounds, polyfunctional compounds, functionalized poly (arylene ether) and combinations comprising at least one of the foregoing. Compatibilizing agents are further described in U.S. Pat. Nos. 5,132,365 and 6,593,411 as well as U.S. Patent Application No. 2003/0166762.

Polyfunctional compounds which may be employed as a compatibilizing agent are of three types. The first type of polyfunctional compounds are those having in the molecule both (a) a carbon-carbon double bond or a carbon-carbon triple bond and (b) at least one carboxylic acid, anhydride, amide, ester, imide, amino, epoxy, orthoester, or hydroxy group. Examples of such polyfunctional compounds include maleic acid; maleic anhydride; fumaric acid; glycidyl acrylate; itaconic acid; aconitic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (e.g., acrylic acid, butenoic acid, methacrylic acid, t-ethylacrylic acid, pentenoic acid; decenoic acids, undecenoic acids, dodecenoic acids, linoleic acid, etc.); esters, acid amides or anhydrides of the foregoing unsaturated carboxylic acids; unsaturated alcohols (e.g. alkyl alcohol, crotyl alcohol, methyl vinyl carbinol, 4-pentene-1-ol, 1,4-hexadiene-3-ol, 3-butene-1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is 5 to 30); unsaturated amines resulting from replacing the —OH group(s) of the above unsaturated alcohols with $NH_2$ groups; functionalized diene polymers and copolymers; and combinations comprising one or more of the foregoing. In one embodiment, the compatibilizing agent comprises maleic anhydride, fumaric acid, or a combination of maleic anhydride and fumaric acid.

The second type of polyfunctional compatibilizing agents are characterized as having both (a) a group represented by the formula (OR) wherein R is hydrogen or an alkyl, aryl, acyl, or carbonyl dioxy group and (b) at least two groups each of which may be the same or different selected from carboxylic acid, acid halide, anhydride, acid halide anhydride, ester, orthoester, amide, imido, amino, and various salts thereof. Exemplary of this group of compatibilizers are the aliphatic polycarboxylic acids, acid esters and acid amides represented by formula (II)

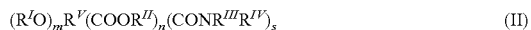
$$(R^IO)_mR^V(COOR^{II})_n(CONR^{III}R^{IV})_s \qquad (II)$$

wherein $R^V$ is a linear or branched chain, saturated aliphatic hydrocarbon having 2 to 20, or, more specifically, 2 to 10, carbon atoms; $R^I$ is hydrogen or an alkyl, aryl, acyl, or carbonyl dioxy group having 1 to 10, or, more specifically, 1 to 6, or, even more specifically, 1 to 4 carbon atoms; each $R^{II}$ is independently hydrogen or an alkyl or aryl group having 1 to 20, or, more specifically, 1 to 10 carbon atoms; each $R^{III}$ and $R^{IV}$ are independently hydrogen or an alkyl or aryl group having 1 to 10, or, more specifically, 1 to 6, or, even more specifically, 1 to 4, carbon atoms; m is equal to 1 and (n+s) is greater than or equal to 2, or, more specifically, equal to 2 or 3, and n and s are each greater than or equal to zero and wherein (OR$^I$) is alpha or beta to a carbonyl group and at least two carbonyl groups are separated by 2 to 6 carbon atoms. Obviously, $R^I$, $R^{II}$, $R^{III}$, and $R^{IV}$ cannot be aryl when the respective substituent has less than 6 carbon atoms.

Suitable polyfunctional compatibilizing agents of the second type also include, for example, citric acid, malic acid, and agaricic acid; including the various commercial forms thereof, such as for example, the anhydrous and hydrated acids; and combinations comprising one or more of the foregoing. In one embodiment, the compatibilizing agent comprises citric acid. Illustrative of esters useful herein include, for example, acetyl citrate, mono- and/or distearyl citrates, and the like. Suitable amides useful herein include, for example, N,N'-diethyl citric acid amide; N-phenyl citric acid amide; N-dodecyl citric acid amide; N,N'-didodecyl citric acid amide; N-dodecyl malic acid, and combinations comprising one or more of the foregoing amides. Derivates include the salts thereof, including the salts with amines and the alkali and alkaline metal salts. Exemplary of suitable salts include calcium malate, calcium citrate, potassium malate, and potassium citrate.

The third type of polyfunctional compatibilizing agents are characterized as having in the molecule both (a) an acid halide group and (b) at least one carboxylic acid, anhydride, ester, epoxy, orthoester, or amide group. Examples of compatibilizers within this group include trimellitic anhydride acid chloride, chloroformyl succinic anhydride, chloro formyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. In one embodiment, the compatibilizing agent comprises trimellitic anhydride acid chloride.

The thermoplastic composition is produced by melt blending the components. The foregoing compatibilizing agents may be added directly to the melt blend or pre-reacted with either or both of the poly(arylene ether) and polyamide, as well as with other resinous materials employed in the preparation of the composition. With many of the foregoing compatibilizing agents, particularly the polyfunctional compounds, even greater improvement in compatibility is found when at least a portion of the compatibilizing agent is pre-reacted, either in the melt or in a solution of a suitable solvent, with all or a part of the poly(arylene ether). It is believed that such pre-reacting may cause the compatibilizing agent to react with the polymer and, consequently, functionalize all or part of the poly(arylene ether). For example, the poly(arylene ether) may be pre-reacted with maleic anhydride to form an anhydride functionalized polyphenylene ether which when melt blended with polyamide and optionally non-functionalized poly(arylene ether) results in a compatibilized poly (arylene ether)/polyamide blend.

Where the compatibilizing agent is employed in the preparation of the compositions, the amount used will be dependent upon the specific compatibilizing agent chosen and the specific polymeric system to which it is added as well as the desired properties of the resultant composition.

Impact modifiers can be block copolymers containing alkenyl aromatic repeating units, for example, A-B diblock copolymers and A-B-A triblock copolymers having of one or two alkenyl aromatic blocks A (blocks having alkenyl aromatic repeating units), which are typically polystyrene blocks, and a rubber block, B, which is typically a polyisoprene or polybutadiene block. The polybutadiene block may be partially or completely hydrogenated. Mixtures of these diblock and triblock copolymers may also be used as well as mixtures of non-hydrogenated copolymers, partially hydrogenated copolymers, fully hydrogenated copolymers and combinations of two or more of the foregoing.

A-B and A-B-A copolymers include, but are not limited to, polystyrene-polybutadiene, polystyrene-poly(ethylene-propylene), polystyrene-polyisoprene, poly(α-methylstyrene)-polybutadiene, polystyrene-polybutadiene-polystyrene (SBS), polystyrene-poly(ethylene-propylene)-polystyrene, polystyrene-polyisoprene-polystyrene and poly(alpha-methylstyrene)-polybutadiene-poly(alpha-methylstyrene), polystyrene-poly(ethylene-propylene-styrene)-polystyrene, and the like. Mixtures of the aforementioned block copolymers are also useful. Such A-B and A-B-A block copolymers are available commercially from a number of sources, including Phillips Petroleum under the trademark SOLPRENE, KRATON Polymers, under the trademark KRATON, Dexco under the trademark VECTOR, Asahi Kasai under the trademark TUFTEC, Total Petrochemicals under the trademarks FINAPRENE and FINACLEAR and Kuraray under the trademark SEPTON.

In some embodiments, the impact modifier comprises polystyrene-poly(ethylene-butylene)-polystyrene, polystyrene-poly(ethylene-propylene) or a combination of the foregoing.

In some embodiments the impact modifier comprises one or more moieties selected from carboxylic acid, anhydride, epoxy, oxazoline, and ester. When the impact modifier comprises a carboxylic acid moiety the carboxylic acid moiety may be neutralized with an ion, such as zinc or sodium. It may be an alkylene-alkyl (meth)acrylate copolymer and the alkylene groups may have 2 to 6 carbon atoms and the alkyl group of the alkyl (meth)acrylate may have 1 to 8 carbon atoms. This type of polymer can be prepared by copolymerizing an olefin, for example, ethylene, propylene, or a combination of ethylene and propylene, with various (meth)acrylate monomers and/or various maleic-based monomers. The term (meth) acrylate refers to both the acrylate as well as the corresponding methacrylate analogue. Included within the term (meth) acrylate monomers are alkyl (meth)acrylate monomers as well as various (meth)acrylate monomers containing at least one of the aforementioned reactive moieties.

The impact modifier can comprise a copolymer derived from ethylene, propylene, or mixtures of ethylene and propylene, as the alkylene component; butyl acrylate, hexyl acrylate, propyl acrylate, a corresponding alkyl (methyl)acrylates or a combination of the foregoing acrylates, for the alkyl (meth)acrylate monomer component, with acrylic acid, maleic anhydride, glycidyl methacrylate or a combination thereof as monomers providing an additional moieties (i.e., carboxylic acid, anhydride, epoxy). In some embodiment the amount of units derived from acrylic acid, maleic anhydride, glycidyl methacrylate or combination thereof may be 2 to 10 weight percent based on the total weight of the copolymer.

In some embodiments, the impact modifier (which comprises one or more moieties selected from the group consisting of carboxylic acid, anhydride, epoxy, oxazoline, and ester) is substantially free of aromatic groups. For example, the impact modifier may be substantially free of aryl alkylene units derived from styrene. The term "substantially free", when used in conjunction with the impact modifier is defined as containing less than or equal to 5 weight percent, or, more specifically, less than or equal to 4 weight percent, or, even more specifically, less than or equal to 3 weight percent, of aromatic groups, such as aryl alkylene units, based on the total weight of the impact modifier comprising one or more moieties selected from the group consisting of carboxylic acid, anhydride, epoxy, oxazoline, and ester.

Exemplary impact modifiers comprising one or more moieties selected from the group consisting of carboxylic acid, anhydride, epoxy, oxazoline, and ester are commercially available under a variety of tradenames including ELVALOY, SURLYN, and FUSABOND, all of which are available from DuPont.

The aforementioned impact modifiers can be used singly or in combination.

The composition may comprise an impact modifier or a combination of impact modifiers, in an amount of 5 to 25 weight percent. Within this range, the impact modifier may be present in an amount greater than or equal to 7 weight percent, or, more specifically, in an amount greater than or equal to 9 weight percent. Also within this range, the impact modifier may be present in an amount less than or equal to 22 weight percent, or, more specifically, less than or equal to 18 weight percent. Weight percent is based on the total weight of the thermoplastic composition.

Electrically conductive carbon blacks are commercially available and are sold under a variety of trade names, including but not limited to S.C.F. (Super Conductive Furnace), E.C.F. (Electric Conductive Furnace), Ketjen Black EC (available from Akzo Co., Ltd.) or acetylene black. In some embodiments the electrically conductive carbon black has an average particle size less than or equal to 200 nanometers (nm), or, more specifically, less than or equal to 100 nm, or, even more specifically, less than or equal to 50 nm. The electrically conductive carbon blacks may also have surface areas greater than 200 square meter per gram ($m^2/g$), or, more specifically, greater than 400 $m^2/g$, or, even more specifically, greater than 1000 $m^2/g$. The electrically conductive carbon black may have a pore volume greater than or equal to 40 cubic centimeters per hundred grams ($cm^3/100$ g), or, more specifically, greater than or equal to 100 $cm^3/100$ g, or, even more specifically, greater than or equal to 150 $cm^3/100$ g, as determined by dibutyl phthalate absorption.

Electrically conductive carbon black particles form aggregates which are clusters of carbon black particles that are strongly attached to one another by physical forces such as van der Waals forces. The aggregates in turn can cluster in agglomerates which are held together by weaker forces and can be decreased in size by forces present during the formation and processing of a thermoplastic composition such as shear.

The amount of electrically conductive carbon black is sufficient to attain a specific volume resistivity of $0.1 \times 10^3$ ohm-cm to $100 \times 10^3$ ohm-cm. The conductive carbon black can be present in amounts of 1 to 10 weight percent, based on the total weight of the composition. Within this range the amount of electrically conductive carbon black can be less than or equal to 5 weight percent.

In some embodiments the average agglomerate size of the electrically conductive carbon black has a significant impact on the quality of powder coating. When the thermoplastic section has electrically conductive black agglomerates with an average agglomerate size of 30 square micrometers to 1000 square micrometers a substantially more uniform paint film thickness is achieved which is free of picture framing detectable by the unaided eye. Within this range the average agglomerate size may be greater than or equal to 31 square micrometers, or, more specifically, greater than or equal to 32 square micrometers. Also within this range the average agglomerate size may be less than or equal to 800 square micrometers, or, more specifically, less than or equal to 600 square micrometers. Average agglomerate size may be determined as described in the examples.

In some compositions the electrically conductive carbon black is so thoroughly dispersed that agglomerates are small and have an average agglomerate size less than 30 square micrometers.

With equal amount by weight of carbon black it was found that a coarser dispersion (larger agglomerates) resulted in more uniform paint film thickness. Additionally, in some embodiments, a weight ratio of electrically conductive carbon black to polyamide of greater than or equal to 0.043, or, more specifically, greater than or equal to 0.045, or, even more specifically, greater than or equal to 0.046, was found to improve powder coating. The weight ratio of electrically conductive carbon black to polyamide may be less than or equal to 0.085. The weight ratio of electrically conductive carbon black to polyamide is determined by: (total weight of electrically conductive carbon black)/(total weight of polyamide).

In some embodiments, the composition comprises a sufficient amount of electrically conductive carbon black to achieve a specific volume resistivity less than or equal to $1 \times 10^3$ ohm-cm. For example, the composition may comprise electrically conductive carbon black in an amount greater than or equal to 2.1 weight percent. Within this range, the electrically conductive carbon black may be present in an amount greater than or equal to 2.2 weight percent, or, more specifically, in an amount greater than or equal to 2.3 weight percent. The electrically conductive carbon black may be present in an amount less than or equal to 10 weight percent, or, more specifically, less than or equal to 5 weight percent. Weight percent is based on the total weight of the composition.

The compositions can also include effective amounts of an additive such as anti-oxidants, flame retardants, drip retardants, dyes, pigments, colorants, stabilizers, small particle mineral such as clay, mica and talc, antistatic agents, plasticizers, lubricants, and combinations comprising at least one of the foregoing. Effective amounts of the additives vary widely, but they can be present in an amount less than or equal to 50 weight percent (wt %), based on the total weight of the composition.

The composition can be prepared melt mixing or a combination of dry blending and melt mixing. Melt mixing can be performed in single or twin screw type extruders or similar mixing devices which can apply a shear to the components.

All of the ingredients may be added initially to the processing system. In some embodiments, the poly(arylene ether) may be melt mixed with the compatibilizing agent prior to melt mixing with the polyamide. Additionally other ingredients such as an impact modifier, additives, a portion of the polyamide or a combination of one or more of the foregoing may be melt mixed with the compatibilizing agent and poly(arylene ether) prior to melt mixing with the remaining polyamide. In one embodiment, the poly(arylene ether) is melt mixed with the compatibilizing agent to form a functionalized poly(arylene ether). The functionalized poly(arylene ether) is then melt mixed with the other ingredients. In another embodiment, the poly(arylene ether), compatibilizing agent, impact modifier, and optional additives are melt mixed to form a first material and the polyamide is then melt mixed with the first material.

When using an extruder, all or part of the polyamide may be fed through a port downstream. While separate extruders may be used in the processing, preparations in a single extruder having multiple feed ports along its length to accommodate the addition of the various components simplifies the process. It is often advantageous to apply a vacuum to the melt through one or more vent ports in the extruder to remove volatile impurities in the composition.

The electrically conductive carbon black may be added by itself, with other ingredients (optionally as a dry blend) or as part of a masterbatch. The conditions employed in making the thermoplastic composition should be chosen to result in the desired average agglomerate size. Exemplary parameters include temperature, length of mixing time, throughput, screw design, location of the electrically conductive carbon black addition and combinations of two or more of these parameters. Adjustment and choice of these parameters is within the skill of one of ordinary skill in the art. In one embodiment, the electrically conductive carbon black can be part of a masterbatch comprising polyamide. The electrically conductive carbon black (independently or as a masterbatch) may be added with the poly(arylene ether), with the polyamide (the second portion when two portions are employed), or after the addition of the polyamide (the second portion when two portions are employed).

In one embodiment, the composition comprises the reaction product of poly(arylene ether); polyamide; electrically conductive carbon black; compatibilizing agent; and impact modifier. As used herein a reaction product is defined as the product resulting from the reaction of two or more of the foregoing components under the conditions employed to form the composition, for example during melt mixing.

After the composition is formed it is typically formed into strands which are cut to form pellets. The strand diameter and the pellet length are typically chosen to prevent or reduce the production of fines (particles that have a volume less than or equal to 50% of the pellet) and for maximum efficiency in subsequent processing such as profile extrusion. An exemplary pellet length is 1 to 5 millimeters and an exemplary pellet diameter is 1 to 5 millimeters.

The pellets may exhibit hygroscopic properties. Once water is absorbed it may be difficult to remove. It is advantageous to protect the composition from ambient moisture. In one embodiment, the pellets, once cooled to a temperature of 50° C. to 110° C., are packaged in a container comprising a mono-layer of polypropylene resin free of a metal layer wherein the container has a wall thickness of 0.25 millimeters to 0.60 millimeters. The pellets, once cooled to 50° C. to 110° C. can also be packaged in foiled lined containers such as foil lined boxes and foil lined bags or other types of containers having a moisture barrier.

The composition may be converted to articles using film extrusion, sheet extrusion, profile extrusion, extrusion molding, compression molding, injection molding, and blow molding. Film and sheet extrusion processes may include and are not limited to melt casting, blown film extrusion and calendaring. Co-extrusion and lamination processes may be employed to form composite multi-layer films or sheets. When the article comprises a multi-layer film or sheet, powder coating is performed on the surface comprising the compatibilized blend of poly(arylene ether), polyamide, impact modifier, and electrically conductive carbon black as described above.

Single or multiple layers of coatings may further be applied to the single or multi-layer thermoplastic sections to impart additional properties such as scratch resistance, ultra violet light resistance, aesthetic appeal, etc. Coatings are applied by standard powder coating application techniques or standard electrostatic coating application techniques.

In powder coating, a powdered resin is applied to the thermoplastic section and then the thermoplastic section and powder are heated so that the powder melts and when subsequently cooled, forms a paint film on the thermoplastic section. The paint film may comprise a thermoset or a thermoplastic. In many references, the heating of the thermoplastic section and the powder deposited on the thermoplastic section to form a paint film is referred to as "curing" regardless of whether the film comprises a thermoplastic or a thermoset. In most powder spraying applications, an electrostatic charge is applied to the sprayed powder which is directed toward a grounded thermoplastic section so as to increase the quantity of powder which attaches to the thermoplastic section and to assist in retaining the powder on the thermoplastic section. In some embodiments, the thermoplastic section is heated prior to powder coating. The thermoplastic section may also be pre treated to remove any residues from molding, handling, or both. In addition, the thermoplastic section may optionally be treated with a primer over at least a portion of the thermoplastic section surface prior to powder coating. The oversprayed powder which is not deposited on the thermoplastic section can be collected. The recovered, oversprayed powder can be saved for future use, or can be immediately recycled to powder spray guns associated with the powder spray.

Accordingly, another embodiment relates to articles and sheets prepared from the compositions above.

Exemplary articles include all or portions of the following articles: furniture, partitions, containers, vehicle interiors including rail cars, subway cars, busses, trolley cars, airplanes, automobiles, and recreational vehicles, exterior vehicle accessories such as roof rails, appliances, cookware, electronics, analytical equipment, window frames, wire conduit, flooring, office furniture, infant furniture and equipment, telecommunications equipment, antistatic packaging for electronics equipment and parts, health care articles (such as hospital beds and dentist chairs), exercise equipment, motor covers, display covers, business equipment parts and covers, light covers, signage, air handling equipment and covers, automotive underhood parts.

In one embodiment the thermoplastic composition consists of:
 a compatibilized blend of a poly(arylene ether) and a polyamide;
 an electrically conductive carbon black;
 an impact modifier, and
 0 to 50% by weight of an additive or combination of additives, based on the combined weight of the compatibilized blend, the electrically conductive carbon black and impact modifier,
wherein the thermoplastic section has a specific volume resistivity less than or equal to $1\times10^3$ ohm-cm. The thermoplastic composition may be used to make a thermoplastic section of an article. The article can be painted by electrostatic painting or by powder coating.

In another embodiment, a thermoplastic composition consists of:
 a compatibilized blend of a poly(arylene ether) and a polyamide;
 an electrically conductive carbon black;
 an impact modifier, and
 0 to 50% by weight of an additive, based on the combined weight of the compatibilized blend, electrically conductive carbon black, impact modifier and additive, wherein the electrically conductive carbon black is dispersed in the polyamide and has an average agglomerate size greater than or equal to 30 square micrometers, wherein the weight ratio of electrically conductive carbon black to polyamide is 0.045 to 0.085. The thermoplastic composition may be used to make a thermoplastic section of an article. The article can be painted by electrostatic painting or by powder coating.

The following non-limiting examples further illustrate the various embodiments described herein.

EXAMPLES

The examples employed the materials listed in Table 1. The amounts employed in the Examples are in weight percent based on the total weight of the composition, unless otherwise stated. Additives in an amount of 0.7 weight percent were also employed.

TABLE 1

| Material | Description/Supplier |
| --- | --- |
| PPE-1 | Poly(2,6-dimethyl-1,4-phenylene ether) having an intrinsic viscosity of 0.40 dl/g as determined in chloroform at 25° C., which is commercially available from GE Plastics. |
| PPE-2 | Poly(2,6-dimethyl-1,4-phenylene ether) having an intrinsic viscosity of 0.46 dl/g as determined in chloroform at 25° C., which is commercially available from GE Plastics. |
| KG 1701 | Polystyrene-poly(ethylene-propylene) commercially available from KRATON Polymers under the tradename KRATON G 1701. |
| KG 1651 | Polystyrene-poly(ethylene-butylene)-polystyrene commercially available from KRATON Polymers under the tradename KRATON G 1651. |
| CA | Anhydrous citric acid commercially available from Cargill. |
| PA 6-1 | Polyamide 6 having an amine end group content of 100 μeq/kg and commercially available from Rhodia under the tradename TECHNYL ASAN 27/32-35 LC. |
| PA 6-2 | Polyamide 6 commercially available from Custom Resins under the tradename RD963. |
| PA 6,6-1 | Polyamide 6,6 commercially available from Rhodia under the tradename TECHNYL 24 FE 1. |
| PA 6,6-2 | Polyamide 6,6 commercially available from Du Pont under the tradename ZYTEL. |
| CCB MB | A masterbatch of conductive carbon black in polyamide 6,6. The masterbatch comprised 8 weight percent conductive carbon black, based on the total weight of the masterbatch. |
| CCB | Conductive carbon black commercially available as KETJEN BLACK EC 600 JD from Akzo. |

Examples 1-8

Examples 1-8 were made by dry blending the PPE-1, KG 1701, KG 1651, citric acid, and additives and adding the dry blend to the feedthroat of a Werner and Pfleiderer 30 millimeter extruder, a laboratory scale extruder. PA 6-1, when present, was added upstream in a second feeder. PA 6,6-1 and the CCB masterbatch were added at downstream feeder. The screw ran at 350 rotations per minute and the feed rate was 50 pounds per hour. The material was extruded, cut into pellets, and then molded as described below. The temperature profile of the extruder is shown in Table 2. Temperature is in degrees Celsius. The compositions of the examples are shown in Table 3. The amount of conductive carbon black (CCB) in each composition was calculated from the amount of conductive carbon black employed in the masterbatch and the amount of masterbatch employed in the example and is shown in the column "Neat CCB". The weight ratio of CCB to polyamide was calculated and is listed in the column labeled CCB/PA.

TABLE 2

| 1 | 2 | 3 | 4 | 5 | 6 | 7 | 8 | 9 | 10 | Die |
| --- | --- | --- | --- | --- | --- | --- | --- | --- | --- | --- |
| 260 | 280 | 280 | 290 | 290 | 290 | 290 | 290 | 290 | 290 | 290 |

TABLE 3

| Ex. | PPE-1 | KG 1701 | KG 1651 | CA | PA 6-1 | PA6,6-1 | CCB MB | Neat CCB | CCB/PA |
|---|---|---|---|---|---|---|---|---|---|
| 1* | 33.93 | 7.96 | 6.96 | 0.70 | — | 32.24 | 17.50 | 1.4 | 0.029 |
| 2* | 33.93 | 7.96 | 6.96 | 0.70 | — | 28.49 | 21.25 | 1.7 | 0.035 |
| 3* | 33.93 | 7.96 | 6.96 | 0.70 | — | 24.87 | 24.87 | 2.0 | 0.042 |
| 4  | 33.93 | 7.96 | 6.96 | 0.70 | — | 20.94 | 28.80 | 2.3 | 0.048 |
| 5* | 33.93 | 7.96 | 6.96 | 0.70 | 9.95 | 22.30 | 17.50 | 1.4 | 0.029 |
| 6* | 33.93 | 7.96 | 6.96 | 0.70 | 9.95 | 18.54 | 21.25 | 1.7 | 0.035 |
| 7* | 33.93 | 7.96 | 6.96 | 0.70 | 9.95 | 14.92 | 24.87 | 2.0 | 0.042 |
| 8  | 33.93 | 7.96 | 6.96 | 0.70 | 9.95 | 11.00 | 28.80 | 2.3 | 0.048 |

*Comparative Example

The examples were tested for specific volume resistivity (SVR). The compositions were molded into ISO tensile bars. The bars were scored and then submerged in liquid nitrogen for approximately 5 minutes. As soon as the bars were removed from the liquid nitrogen they were snapped at the score marks for a brittle break. The ends were painted with electrically conductive silver paint and dried. Resistance was measured by placing the probes of a handheld multimeter such as a Mastech M92A multimeter on each painted end of the bar. The resistivity was calculated as the resistance (in Ohms) X bar width (in centimeters (cm)) X bar depth (cm) divided by the bar length (cm). Data is shown Table 4.

The examples were also rated, on a visual basis, for picture framing on an injection molded article. The injection molded article, as shown schematically in FIG. 8, had a width, 70, of 352 millimeters, a height, 80, of 33 millimeters, a length, 85, of 336 millimeters. FIG. 9 is a cross section of the article having a wall thickness, 90, of 3 millimeters. The articles were powder coated using a Nordson spray booth at 24° C. and 50% relative humidity and polyester epoxy hybrid powder coating from IVC Industrial Coatings. Dry off temperatures were 185-199° C. for 20 minutes and cure temperatures were 185-199° C. for 20 minutes. Picture framing I was visually rated for severity at a corner location. Rating was based on a scale of 1 to 10 with 1 is the worst and 10 is the best. Picture framing II was rated by attribute where N (for None) indicated no visually detectable picture framing and Y (for Yes) indicated picture framing was present. Paint coverage was also visually evaluated as either I (for Insufficient) or C (for Complete). Data is shown in Table 4.

TABLE 4

| Ex. | Neat CCB | Picture Framing I | Picture Framing II | Paint Coverage | SVR (×10³ ohm-cm) |
|---|---|---|---|---|---|
| 1* | 1.4 | 8  | Y | I | 45.9 |
| 2* | 1.7 | 5  | Y | I | 11.1 |
| 3* | 2.0 | 3  | Y | C | 1.4 |
| 4  | 2.3 | 10 | N | C | 0.6 |
| 5* | 1.4 | 8  | Y | I | 803.1 |
| 6* | 1.7 | 4  | Y | I | 7.9 |
| 7* | 2.0 | 2  | Y | C | 1.7 |
| 8  | 2.3 | 10 | N | C | 0.8 |

*Comparative Example

Figure 10:
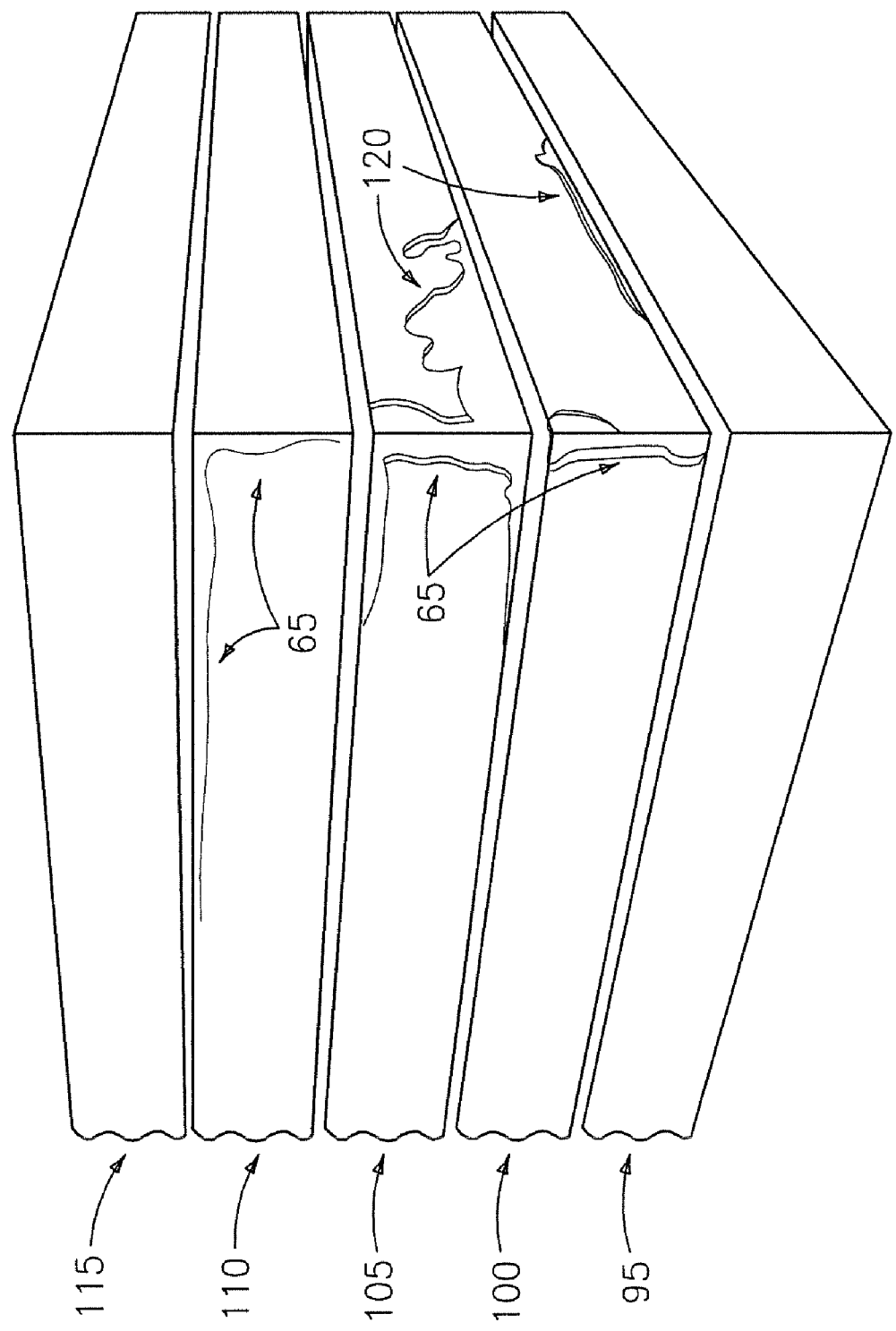
FIG. 10 shows, in a comparative way, the results of powder coating in various examples.

FIG. 10 shows an uncoated part, 95, a coated part, 100, according to Example 1, a coated part, 105, according to Example 2, a coated part, 110, according to Example 3, and a coated part, 115, according to Example 4. Picture framing, 65, and discontinuous coverage, 120, is also shown. Surprisingly, increasing conductive carbon black loading demonstrates an inverse relationship with picture framing rating until a conductive carbon black loading of greater than 2.0 weight percent and an SVR less than 1.0×10³ ohm-cm is achieved as shown by Table 4 and FIG. 5.

Figure 11:
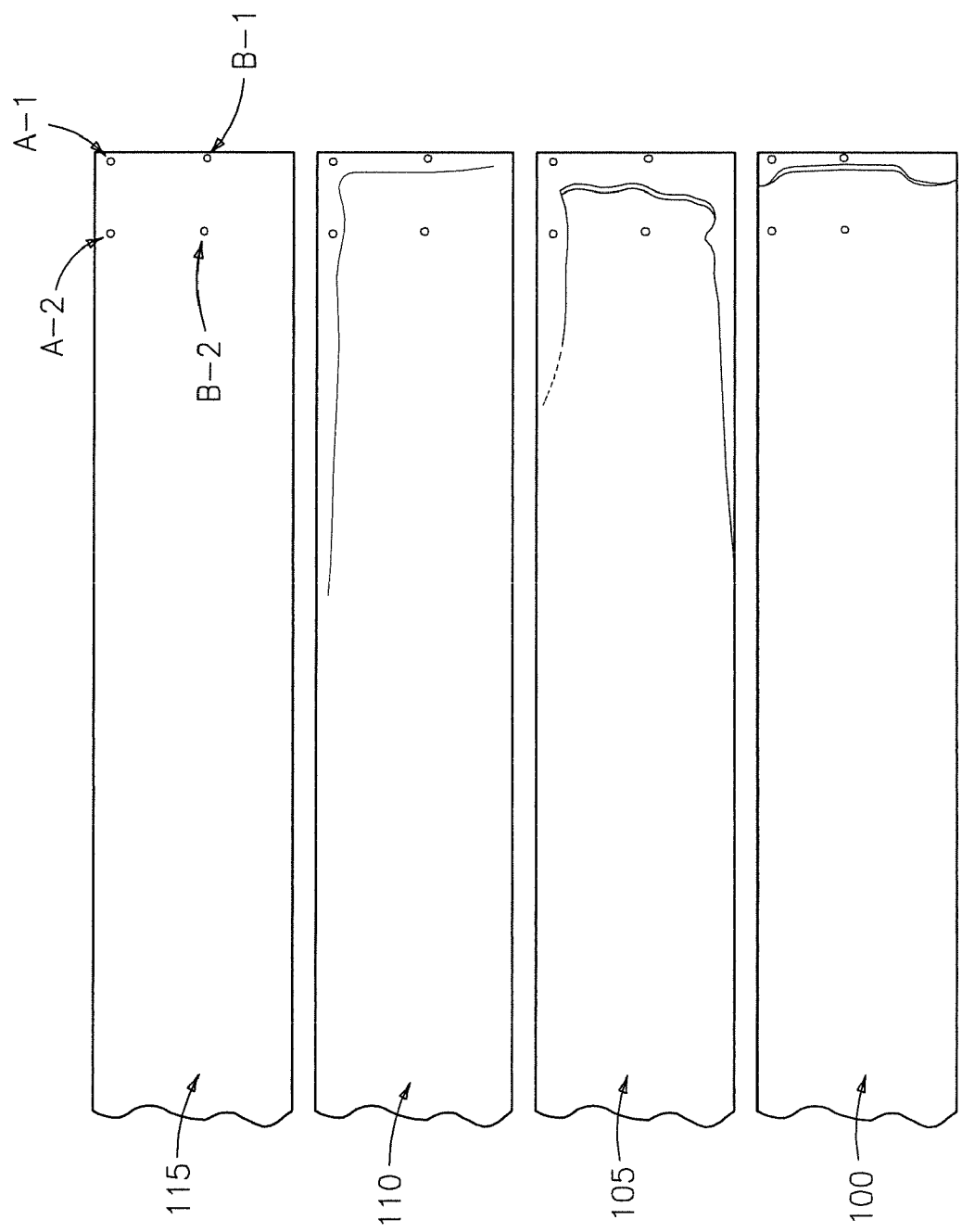
FIG. 11 shows exemplary locations of paint film measurements.

FIG. 11 shows a coated part, 100, according to Example 1, a coated part, 105, according to Example 2, a coated part, 110, according to Example 3, and a coated part, 115, according to Example 4. FIG. 11 also shows the locations of the four points at which the paint film thickness was measured. The article was cut with a band saw to cross section the article on the line formed by points A-1 and A-2 as well as on the line formed by B-1 and B-2. Sections were taken with a diamond knife from the cross sectioned piece at A-1, A-2, B-1, and B-2. A-1 was located 3.175, millimeters from the two closest edges. A-2 was located 3.175 from one edge and 14, millimeters from the adjoining edge. B-1 was located 3.175 millimeters from one edge and 19 millimeters from the adjoining edge. B-2 was located 14 millimeters from one edge and 19 millimeters from the adjoining edge. The sections were viewed with an Olympus BX60 compound light microscope using reflected light. An Optronics microfire digital camera mounted to the light microscope with Optronics Pictureframe capture software was used to capture the digital optical micrographs of the powder coated film layer/thermoplastic sections. Image-pro plus version 4.5, image analysis software was used to measure the paint film thickness from the captured digital optical micrographs. Data is shown in Table 5. The paint film thickness values are in micrometers. The average of A-1, A-2 and B-1 is the average edge thickness for a corner. The thickness at B-2 is the interior thickness.

TABLE 5

|   | Thickness at A-1 | Thickness at A-2 | Thickness at B-1 | Thickness at B-2 | Average of A-1, A-2 and B-1 | ((Average of A-1, A-2, and B-1)/B-2) * 100 | Picture Framing II |
|---|---|---|---|---|---|---|---|
| 1* | 72.0  | 14.4  | 42.1  | 12.6 | 42.8  | 340% | Y |
| 2* | 59.8  | 86.1  | 58.7  | 19.2 | 68.2  | 355% | Y |
| 3* | 137.8 | 117.8 | 104.5 | 58.4 | 120.0 | 205% | Y |
| 4  | 56.1  | 39.1  | 45.8  | 33.2 | 47.0  | 141% | N |

*Comparative Example

Surprisingly, increasing conductive carbon black loading demonstrates an inverse relationship with picture framing rating until a conductive carbon black loading of greater than 2.0 weight percent and an SVR less than $1.0 \times 10^3$ ohm-cm is achieved as shown by Table 5 and FIG. 7. Example 4, when injection molded into an article and powder coated, has a paint film thickness at an average edge paint film thickness that is 141% of the interior area and picture framing is not visible to the unaided eye.

Examples 9-13

Examples 9-12 were made by dry blending the KG 1701, KG 1651,, citric acid, additives, and PPE-1 or PPE-2 and adding the dry blend to the feedthroat of a Werner and Pfleiderer 120 millimeter extruder, a production scale extruder. Example 9 used a CCB MB and Examples 10-12 used CCB powder as received. For Example 9 the polyamide and the CCB MB were added at the same downstream inlet. For examples 10-12, the polyamide was added at a first downstream inlet and the electrically conductive carbon black was added at the second downstream inlet. The second inlet was farther downstream than the first inlet. For Example 9, the amount of conductive carbon black in the composition was calculated from the amount of conductive carbon black employed in the masterbatch and the amount of masterbatch employed in the example and is shown in the column "Neat CCB". For Example 9, the screw ran at 350 rotations per minute and the feed rate was 1542 kilograms per hour (3400 pounds per hour). For Examples 10-12, the screw ran at 235 rotations per minute and the feed rate was 907 kilograms per hour (2000 pounds per hour). The material was extruded, cut into pellets, and then molded and coated as described above. The temperature profile of the extruder for Example 9 is shown in Table 4. The temperature profile of the extruder for Examples 10-12 is shown in Table 5. Temperature is in degrees Celsius. The compositions of the examples are shown in Table 6.

TABLE 4

| 1 | 2 | 3 | 4 | 5 | 6 | 7 | 8 | 9 | 10 | Die |
|---|---|---|---|---|---|---|---|---|----|-----|
| 121 | 299 | 299 | 299 | 299 | 299 | 299 | 299 | 299 | 299 | 304 |

TABLE 5

| 1 | 2 | 3 | 4 | 5 | 6 | 7 | 8 | 9 | 10 | 11 | 12 | 13 | Die |
|---|---|---|---|---|---|---|---|---|----|----|----|----|-----|
| 177 | 315 | 321 | 321 | 321 | 321 | 321 | 310 | 277 | 277 | 277 | 277 | 277 | 304 |

TABLE 6

| Ex | PPE-1 | PPE-2 | KG 1701 | KG 1651 | CA | PA 6-1 | PA 6-2 | PA6,6-1 | PA 6,6-2 | CCB MB | Neat CCB | CCB |
|----|-------|-------|---------|---------|-----|--------|--------|---------|----------|--------|----------|-----|
| 9* | 33.9 | — | 8.0 | 7.0 | 0.7 | 10.0 | — | 14.8 | — | 24.9 | 2.0 | — |
| 10 | — | 47.9 | — | 5.2 | 0.7 | — | 43.6 | — | — | — | — | 2.0 |
| 11 | — | 47.9 | — | 5.2 | 0.7 | — | — | — | 43.6 | — | — | 2.0 |
| 12 | 47.9 | — | — | 5.2 | 0.7 | 11.0 | 32.6 | — | — | — | — | 2.0 |

*Comparative Example

The examples were tested for specific volume resistivity (SVR) as described above.

To determine the paint film thickness the article was cut with a band saw to cross section the article on the line formed by points A-1 and A-2 as well as on the line formed by B-1 and B-2. Samples were taken from the cross sectioned piece at A-1, A-2, B-1, and B-2 which were located as described in Examples 1-4. The samples were trimmed and block-faced using a scalpel. The samples were then microtomed perpendicular to the coated surface using a glass knife followed by further microtoming with a diamond knife. Analysis was performed on the samples, not the sections removed by microtoming. The samples were mounted on SEM sample stubs and coated with gold for 50 seconds under a plasma current of 13, milliangstroms. The samples were then viewed by scanning electron microscopy (SEM) under vacuum at a magnification of 200× in the back-scattered electron (BSE) mode. Image analysis was performed using Clemex Vision PE 4.0 software. Approximately 50 measurements of thickness across the image were performed and the value reported is the mean thickness of the film.

The average conductive carbon black agglomerate size (avg. agg. sz) was determined using optical microscopy. Injection molded samples were manually trimmed and block-faced using a scalpel. The samples were then microtomed using a glass knife to remove the top 100 micrometers which was discarded. A 1 micrometer thick section was then cut from the face of the samples using a diamond knife. The section was placed on a microscope slide. Non-drying immersion oil was placed on top of the section and covered with a cover glass. The section was viewed using an Olympus BX60 optical microscope at 10× magnification. The observed field area of each section was 1.04 square millimeters. An image of the section was obtained and analyzed using Clemex Vision PE 4.0 software.

The weight ratio of conductive carbon black to polyamide is shown in Table 7. Paint film thickness is reported in micrometers. Example 13 is a compatibilized blend poly (arylene ether) and polyamide which comprises electrically conductive carbon black and is commercially available under the tradename NORYL GTX 974 from GE Plastics. Powder coated articles made using NORYL GTX 974, had picture framing that was visible to the unaided eye. Data is shown in Table 7.

TABLE 7

|  | 9* | 10 | 11 | 12 | 13* |
|---|---|---|---|---|---|
| Avg agg. Sz (micrometers$^2$) | 25.4 | 44.7 | 33.1 | 60 | 113.1 |
| CCB/PA | 0.042 | 0.046 | 0.046 | 0.046 | 0.035 |
| SVR (×10$^3$ ohm-cm) | 7.4 | 2.6 | 0.9 | 2.1 | — |
| Thickness at A-1 | 124.3 | 73.7 | 78.7 | 102.8 | — |
| Thickness at A-2 | 129.4 | 72.3 | 55.6 | 72.6 | — |
| Thickness at B-1 | 93.7 | 70.4 | 52.6 | 86.1 | — |
| Thickness at B-2 | 57.1 | 61.8 | 39.6 | 55.4 | — |
| Average of A-1, A-2, and B-1 | 101.1 | 69.5 | 56.6 | 79.2 | — |
| ((Average of A-1, A-2, and B-1)/B-2 thickness) * 100 | 177% | 112% | 143% | 143% | — |

*Comparative Example

Example 9 when compared to Examples 10 through 13 show that when the thermoplastic section has conductive carbon black particles with an average agglomerate size greater than or equal to 30 square micrometers and a weight ratio of conductive carbon black to polyamide greater than or equal to 0.043 the thermoplastic section shows excellent powder coating coverage and does not exhibit picture framing as indicated by an average edge paint film thickness that is 112% to 143% of the interior paint film thickness.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An article comprising:
   a paint film and a thermoplastic section;
   wherein the paint film is disposed on at least a portion of the thermoplastic section; and
   wherein the thermoplastic section comprises
      a compatibilized blend of a poly(arylene ether) and a polyamide;
      an electrically conductive carbon black; and
      an impact modifier;
      wherein the electrically conductive carbon black comprises agglomerates and the agglomerates have an average agglomerate size of 30 to 600 square micrometers; and
   wherein a weight ratio of electrically conductive carbon black to polyamide is greater than or equal to 0.043.

2. The article of claim 1, wherein the paint film has less than or equal to 5 variations in thickness that are visible to the unaided eye at a distance of 25 centimeters.

3. The article of claim 1, wherein the paint film has less than or equal to 3 variations in thickness that are visible to the unaided eye at a distance of 25 centimeters.

4. The article of claim 1, wherein the paint film has less than or equal to 1 variation in thickness that is visible to the unaided eye at a distance of 25 centimeters.

5. The article of claim 1, wherein the paint film is free of thickness variations visible to the unaided eye at a distance of 25 centimeters.

6. The article of claim 1, wherein the paint film is produced by powder coating and the paint film has less than or equal to 5 variations in thickness that are visible to the unaided eye at a distance of 25 centimeters.

7. The article of claim 1, wherein the paint film is produced by powder coating and the paint film has less than or equal to 3 variations in thickness that are visible to the unaided eye at a distance of 25 centimeters.

8. The article of claim 1, wherein the paint film is produced by powder coating and the paint film is free of thickness variations visible to the unaided eye at a distance of 25 centimeters.

9. An article comprising:
   a paint film and a thermoplastic section;
   wherein the thermoplastic section comprises a surface A;
   wherein the surface A has an edge B;
   wherein the paint film is disposed on at least a portion of the surface A;
   wherein the paint film is disposed on at least a portion of the edge B;

wherein the paint film has an edge thickness measured on a line perpendicular to the edge B at a distance of 3.175 millimeters from the edge B;
wherein the paint film has an interior thickness measured on the line perpendicular to the edge B at a distance of 14 millimeters from the edge B;
wherein the edge thickness is 60% to 150% of the interior thickness;
wherein the edge thickness and the interior thickness are determined after the paint film is disposed on the surface A and the edge B and before further processing of the paint film; and
wherein the thermoplastic section comprises
 a compatibilized blend of a poly(arylene ether) and a polyamide;
 an electrically conductive carbon black; and
 an impact modifier;
 wherein the electrically conductive carbon black comprises agglomerates and the agglomerates have an average agglomerate size of 30 to 600 square micrometers;
 wherein the weight ratio of electrically conductive carbon black to polyamide is greater than or equal to 0.043.

10. The article of claim 9 wherein the average agglomerate size is greater than or equal to 32 square micrometers; and
 wherein the weight ratio of electrically conductive carbon black to polyamide is greater than or equal to 0.045.

11. The article of claim 9 wherein the average agglomerate size is greater than or equal to 31 square micrometers.

12. The article of claim 9 wherein the average agglomerate size is greater than or equal to 32 square micrometers.

13. The article of claim 9, wherein the weight ratio of electrically conductive carbon black to polyamide is greater than or equal to 0.045.

14. The article of claim 9, wherein the paint film is produced by electrostatic painting.

15. The article of claim 9, wherein the paint film is produced by powder coating; and
 wherein the article has an average edge thickness that is 60% to 150% of the average interior thickness.

16. The article of claim 9, wherein the paint film is produced by powder coating; and
 there is no point along the edge B where the edge thickness is greater than 150% of the corresponding interior thickness.

17. An article comprising:
a paint film and a thermoplastic section;
wherein the thermoplastic section comprises a surface A;
wherein surface A comprises a surface feature edge D;
wherein the paint film is disposed on at least a portion of the surface A;
wherein the paint film is disposed on at least a portion of the surface feature edge D;
wherein the paint film has a surface feature edge thickness measured on a line perpendicular to the surface feature edge D at a distance of 2 millimeters from surface feature edge D;
wherein the paint film has an interior thickness measured on the line perpendicular to the surface feature edge D at a distance of 10 millimeters from surface feature edge B;
wherein the surface feature edge thickness is 60% to 150% of the interior thickness;
wherein the surface feature edge thickness and the interior thickness are determined after the paint film is disposed on the surface A and the surface feature edge D, and before further processing of the paint film;
wherein the thermoplastic section comprises
 a compatibilized blend of a poly(arylene ether) and a polyamide;
 an electrically conductive carbon black; and
 an impact modifier;
 wherein the electrically conductive carbon black comprises agglomerates and the agglomerates have an average agglomerate size of 30 to 600 square micrometers;
 wherein the weight ratio of electrically conductive carbon black to polyamide is greater than or equal to 0.043.

18. The article of claim 17 wherein the average agglomerate size is greater than or equal to 32 square micrometers; and
 the weight ratio of electrically conductive carbon black to polyamide is greater than or equal to 0.045.

19. The article of claim 17 wherein the average agglomerate size is greater than or equal to 31 square micrometers.

20. The article of claim 17 wherein the average agglomerate size is greater than or equal to 32 square micrometers.

21. The article of claim 17, wherein the weight ratio of electrically conductive carbon black to polyamide is greater than or equal to 0.045.

22. The article of claim 17, wherein the paint film is produced by electrostatic painting.

23. The article of claim 17, wherein the paint film is produced by powder coating; and
 wherein the article has an average surface feature edge thickness that is 60% to 150% of the average interior thickness.

24. The article of claim 17, wherein the paint film is produced by powder coating; and
 there is no point along surface feature edge D where the surface feature edge thickness is greater than 150% of the corresponding interior thickness.

25. An article comprising:
a paint film and a thermoplastic section;
wherein the thermoplastic section comprises a surface A;
wherein surface A has adjoining edges, edge B and an edge K;
wherein the intersection of edge B and edge K is corner J;
wherein the paint film is disposed on the corner J and at least a portion of the edge B and the edge K;
wherein the paint film has an average edge thickness that is 60% to 150% of an interior thickness;
wherein the average edge thickness, and interior thickness are measured after the paint film is disposed on surface A , edge B, edge K and corner J and before further processing of the paint film;
wherein the thermoplastic composition comprises
 a compatibilized blend of a poly(arylene ether) and a polyamide;
 an electrically conductive carbon black; and
 an impact modifier;
 wherein the electrically conductive carbon black comprises agglomerates and the agglomerates have an average agglomerate size of 30 to 600 square micrometers;
wherein the weight ratio of electrically conductive carbon black to polyamide is greater than or equal to 0.043.

26. The article of claim 25 wherein the average agglomerate size is greater than or equal to 32 square micrometers and the weight ratio of electrically conductive carbon black to polyamide is greater than or equal to 0.045.

27. The article of claim 25 wherein the average agglomerate size is greater than or equal to 31 square micrometers.

28. The article of claim 25 wherein the average agglomerate size is greater than or equal to 32 square micrometers.

29. The article of claim 25, wherein the weight ratio of electrically conductive carbon black to polyamide is greater than or equal to 0.045.

30. The article of claim 25, wherein the paint film is produced by electrostatic painting.

31. The article of claim 25, wherein the paint film is produced by powder coating.

32. The article of claim 25, wherein the paint film is produced by powder coating; and
wherein the article comprises greater than or equal to two corners and greater than or equal to two corners have an average edge thickness that is 60% to 150% of the corresponding interior thickness.

33. The article of claim 25, wherein the paint film is produced by powder coating; and
wherein the article comprises greater than or equal to three corners and greater than or equal to three corners have an average edge thickness that is 60% to 150% of the corresponding interior thickness.

34. The article of claim 25, wherein the paint film is produced by powder coating; and
wherein the article comprises greater than or equal to four corners and greater than or equal to four corners have an average edge thickness that is 60% to 150% of the corresponding interior thickness.

35. An article comprising:
a paint film produced by powder coating and a thermoplastic section;
wherein the thermoplastic section comprises a surface A;
wherein the surface A has an edge B;
wherein the paint film is disposed on at least a portion of the surface A;
wherein the paint film is disposed on at least a portion of the edge B;
wherein the paint film has an edge thickness measured on a line perpendicular to the edge B at a distance of 3.175 millimeters from the edge B;
wherein the paint film has an interior thickness measured on the line perpendicular to the edge B at a distance of 14 millimeters from the edge B;
wherein the edge thickness is 60% to 150% of the interior thickness;
wherein the edge thickness and the interior thickness are determined after the paint film is disposed on the surface A and the edge B and before further processing of the paint film; and
wherein the thermoplastic section comprises
a compatibilized blend of a poly(arylene ether) and a polyamide;
an electrically conductive carbon black; and
an impact modifier;
wherein the electrically conductive carbon black comprises agglomerates and the agglomerates have an average agglomerate size of 32 to 600 square micrometers;
wherein the weight ratio of electrically conductive carbon black to polyamide is greater than or equal to 0.045.

36. A method of making an article comprising:
disposing electrically charged particles onto at least a portion of a grounded thermoplastic section,
wherein the thermoplastic sections comprises
a compatibilized blend of a poly(arylene ether) and a polyamide;
an electrically conductive carbon black; and
an impact modifier;
wherein the electrically conductive carbon black comprises agglomerates and the agglomerates have an average agglomerate size of 30 to 600 square micrometers; and
wherein the weight ratio of electrically conductive carbon black to polyamide is greater than or equal to 0.043.

37. The method of claim 36, wherein the electrically charged particles are liquid paint particles.

38. The method of claim 36, wherein the electrically charged particles are solid paint particles.

* * * * *